United States Patent
Wakabayashi et al.

(12) 
(10) Patent No.: US 6,617,384 B2
(45) Date of Patent: *Sep. 9, 2003

(54) RACING TIRE TREAD RUBBER COMPOSITION

(75) Inventors: Noboru Wakabayashi, Kobe (JP); Toru Iizuka, Akashi (JP)

(73) Assignee: Sumitomo Rubber Industries, Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,245

(22) Filed: Sep. 17, 1997

(65) Prior Publication Data

US 2002/0052436 A1 May 2, 2002

(30) Foreign Application Priority Data

Sep. 24, 1996 (JP) .............................. 8-252017

(51) Int. Cl.$^7$ ............................... C08L 91/03
(52) U.S. Cl. ....................................... 524/302
(58) Field of Search ......................... 524/302

(56) References Cited

U.S. PATENT DOCUMENTS

| | | | | |
|---|---|---|---|---|
| 3,629,038 A | | 12/1971 | Satake et al. | 156/245 |
| 4,429,068 A | * | 1/1984 | Nakahira | 524/302 |
| 5,017,660 A | * | 5/1991 | Hattori et al. | 525/338 |
| 5,049,610 A | * | 9/1991 | Takaki et al. | 524/514 |
| 5,500,482 A | | 3/1996 | Muraki et al. | 525/98 |

FOREIGN PATENT DOCUMENTS

| | | |
|---|---|---|
| EP | 0559218 | 9/1993 |
| JP | A-62 4732 | 1/1987 |
| JP | 62 004732 | 10/1987 |
| WO | WO 9534601 | 12/1995 |

* cited by examiner

*Primary Examiner*—Peter D. Mulcahy
(74) *Attorney, Agent, or Firm*—Birch, Stewart, Kolasch & Birch, LLP

(57) ABSTRACT

The present invention provides a racing tire tread rubber composition which is used for producing a racing tire having excellent wet grippability and does not cause any excessive adhesion in tire production process steps such as kneading and extruding steps. The racing tire tread rubber composition is a composition comprising: 100 parts by weight of a diene-based rubber; a filler, the entirety of which is in the range of 100 to 250 parts by weight containing 20 parts by weight or more of silica; and 5 to 50 parts by weight of a factice.

4 Claims, 1 Drawing Sheet

X 100

X 200

RACING TIRE TREAD RUBBER COMPOSITION

BACKGROUND OF THE INVENTION

A. Technical Field

The present invention relates to a racing tire tread rubber composition.

B. Background Art

As to a racing tire that might be run on a road wet with rain and so on, it is important to enhance the wet grippability of the tire. Generally proposed methods for enhancing the wet grippability comprise, for example, increasing the following factors: (1) the hysteresis loss; (2) the adhesive friction; and (3) the turning-up friction.

Thus, in recent years, a method for enhancing the wet grippability has been studied in which the adhesive friction is increased by adding a large amount of fillers such as silica. However, a tire containing a large amount of silica has many problems in the production. The most serious problem is a phenomenon which is called excessive adhesion. This phenomenon causes a problem in that when a rubber composition is kneaded or extruded during a tire manufacturing process, it strongly adheres to a kneading or extruding apparatus, so that the adhered rubber composition is very difficult to remove, or that the above-mentioned apparatus needs to be washed carefully after processing every batch.

SUMMARY OF THE INVENTION

A. Object of the Invention

An object of the present invention is to provide a racing tire tread rubber composition which is used for producing a racing tire having excellent wet grippability and does not cause any excessive adhesion in tire production process steps such as the kneading and extruding steps.

B. Disclosure of the Invention

The present inventors studied diligently about the types or the amount of the combination of additives, which are combined into a racing tire tread rubber composition containing silica, in order to solve the above-mentioned problems. As a result, the inventors attained the present invention.

Thus, a racing tire tread rubber composition, according to the present invention, is a composition comprising: 100 parts by weight of a diene-based rubber; a filler, the entirety of which is in the range of 100 to 250 parts by weight containing 20 parts by weight or more of silica; and 5 to 50 parts by weight of a factice.

These and other objects and the advantages of the present invention will be more fully apparent from the following detailed disclosure.

DETAILED DESCRIPTION OF THE INVENTION

Figure 1:
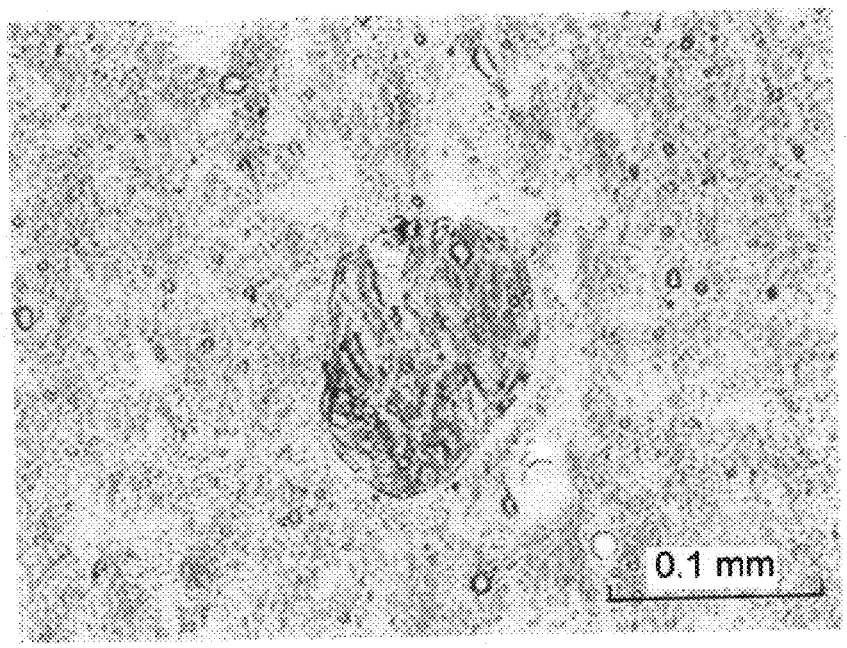
FIG. 1 is a micrograph as obtained by observing a section of a tread portion of a tire according to Example 1.

A racing tire tread rubber composition, according to the present invention, is a composition comprising: a diene-based rubber; a filler containing silica as the essential component; and a factice.

[Diene-based Rubber]

The diene-based rubber as used in the present invention is at least one type selected from the group consisting of natural rubber and diene-based synthetic rubbers. Although not especially limited, examples of the diene-based synthetic rubbers include styrene-butadiene rubber (SBR), butadiene rubber (BR), isoprene rubber (IR), isoprene-isobutyrene rubber (IIR), and butyl halide rubber (X-IIR). These diene-based rubbers may be used alone respectively or, if need arises, in combinations of two or more thereof. Among the diene-based rubbers, styrene-butadiene rubber (SBR) is preferable for increasing the hysteresis loss.

[Filler]:

The filler as used in the present invention is combined to provide sufficient hardness to a racing tire as produced by shaping the rubber composition. The filler is not especially limited providing that it contains silica as the essential component. The inclusion of silica improves the adhesive friction and thereby enhances the wet grippability.

Examples of fillers other than silica include: inorganic fillers such as carbon black, clay, talc, calcium carbonate, basic magnesium carbonate, alumina, mica, graphite, and glass powder; and organic fillers such as high styrene resin, coumarone-indene resin, phenol resin, modified melamine resin, and petroleum resin. At least one of these fillers can be used jointly with silica.

The ratio of the combination of the filler (containing silica) in the racing tire tread rubber composition is in the range of 100 to 250 parts by weight, preferably, 120 to 200 parts by weight, more preferably, 140 to 180 parts by weight, per 100 parts by weight of the diene-based rubber. Where the amount of the combination of the filler is larger than 250 parts by weight, a large load or the excessive adhesion might occur in tire production process steps such as kneading and extruding steps. Where the amount of the combination of the filler is smaller than 100 parts by weight, there is a possibility that the hysteresis loss might not be large, that sufficient friction might not be obtained, and that the wet grippability might therefore be deteriorated.

The ratio of the combination of silica, which is the essential component of the filler, is 20 parts by weight or more per 100 parts by weight of the diene-based rubber. Where the ratio of the combination of silica is less than 20 parts by weight, there is a possibility that sufficient adhesive friction might not be obtained, and that the wet grippability might therefore be deteriorated.

The ratio of the combination of silica is preferably not less than 50% by weight, more preferably, not less than 70% by weight, of the entirety of the filler. Where the ratio of the combination of silica is less than 50% by weight, there is a possibility that sufficient adhesive friction might not be obtained, and that the wet grippability might therefore be deteriorated. In addition, where the ratio of the combination of silica is increased, it is preferable to also increase the ratio of the combination of the below-mentioned factice in order to avoid the excessive adhesion.

[Factice]

The factice is combined to solve the problem of the excessive adhesion as caused by combining silica. The factice is a component as commonly called "SABU" in Japanese and is a cured oil of 1.03 to 1.05 in specific density and is a brittle solid with elasticity like rubber. The factice, for example, can be obtained by reacting an animal or vegetable oil and fat of 70 or more in iodine value with sulfur or a sulfur-containing compound such as sulfur chloride under heating.

Examples of the factice include: white factice which is white or light yellow and has a sulfur content of 6 to 8%;

brown factice which is a black brown elastomer as obtained by adding sulfur to an oxidized vegetable oil and heating to high temperature and has a sulfur content of 15 to 20%; transparent amber-colored factice as produced by action of only sulfur chloride; and special factices as obtained from different animal or vegetable oils and fats of starting materials. Among these factices, brown factice is preferable, because the brown factice has a great effect to prevent the excessive adhesion. The factices may be used alone respectively or, if need arises, in combinations of two or more thereof.

The ratio of the combination of the factice in the racing tire tread rubber composition is in the range of 5 to 50 parts by weight, preferably, 10 to 40 parts by weight, more preferably, 20 to 30 parts by weight, per 100 parts by weight of the diene-based rubber. Where the ratio of the combination of the factice is larger than 50 parts by weight, the resultant rubber might be too soft, and the abrasion resistance might therefore be low. In addition, where the amount of the combination of the factice is smaller than 5 parts by weight, the excessive adhesion occurs in tire production process steps such as rubber-kneading and extruding steps.

If the ratio of the factice is large within the above-mentioned combination range, the wet grippability is preferably further improved. The reason for this is as follows: as to a rubber composition having a high ratio of a factice, a rubber as obtained by vulcanizing this composition has so high softness as to decrease the hysteresis loss, but a tire as formed from this rubber has a wide area contacting a road, so that the wet grippability is improved.

The factice as contained in a tread portion of a tire can easily be verified by observing a section of the tread portion with a microscope.

[Other Components]

If need arises, the racing tire tread rubber composition may further comprise the following additives: softeners such as naphtene-based process oil and aromatic oil; low temperature plasticizers such as phthalic derivatives, adipic derivatives, azelaic derivatives, sebacic derivatives, and phosphoric derivatives; vulcanizers such as sulfur, insoluble sulfur, and sulfur compounds; covulcanizers (vulcanization activators) such as zinc oxide and stearic acid; vulcanization accelerators such as thiazole-based compounds (e.g., mercaptobenzothiazole (MBT), benzothiazyl disulfide (MBTS), N-tert-butyl-2-benzothiazolylsulfenamide (TBBS), N-cyclohexyl-2-benzothiazylsulfenamide (CBS)) and guanidine-based compounds (e.g. diphenylguanidine (DPG)); organic fibers; foaming agents; antioxidants; and wax. The ratio of the combination of these additives in the tread rubber composition is not especially limited and can fitly be selected.

Conventional methods can be applied to a production process for the racing tire tread rubber composition. The composition, for example, can be obtained by kneading the above-mentioned components with kneading-machines such as kneaders and Banbury mixers under conventional conditions by conventional methods. In addition, the kneading temperature is preferably in the range of 120 to 180° C.

A racing tire is obtained by shaping and vulcanizing the above-explained racing tire tread rubber composition.

(Effects and Advantages of the Invention)

The racing tire tread rubber composition of the present invention can provide a racing tire tread rubber composition which is used for producing a racing tire having excellent wet grippability and does not cause any excessive adhesion in tire production process steps such as kneading and extruding steps.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

EXAMPLES 1 TO 5

Comparative Examples 1 to 5

Components of the combinations, as shown in Tables 1 and 2 below, were divided into the below-mentioned three batches, and each of these batches was mixed together by kneading it with a Banbury type mixer of 50 liters in capacity at a charging ratio of 70% for 4 minutes, thus obtaining racing tire tread rubber compositions.

First stage batch: the entirety of SBR, half of silica, half of carbon black, half of aromatic oil, the entirety of coupling agent, and the entirety of factice.

Second stage batch: the kneaded mixture resultant from the first stage batch, the other half of the silica, the other half of the carbon black, the other half of the aromatic oil, the entirety of stearic acid, and the entirety of zinc white (zinc oxide).

Third stage batch: the kneaded mixture resultant from the second batch, the entirety of sulfur, and the entirety of vulcanization accelerators.

Tires were made using the resultant tread rubber compositions while evaluating the excessive adhesion in the below-mentioned way.

Thin piece samples of 1.0 to 1.5 $\mu$m in thickness were cut off from tread portions of the resultant tires with a MICROTOME, and then swelled with an organic solvent (xylene), and then attached to glass plates, and then observed with a microscope. During this observation, micrographs of sections of the thin pieces were taken.

Figure 2:
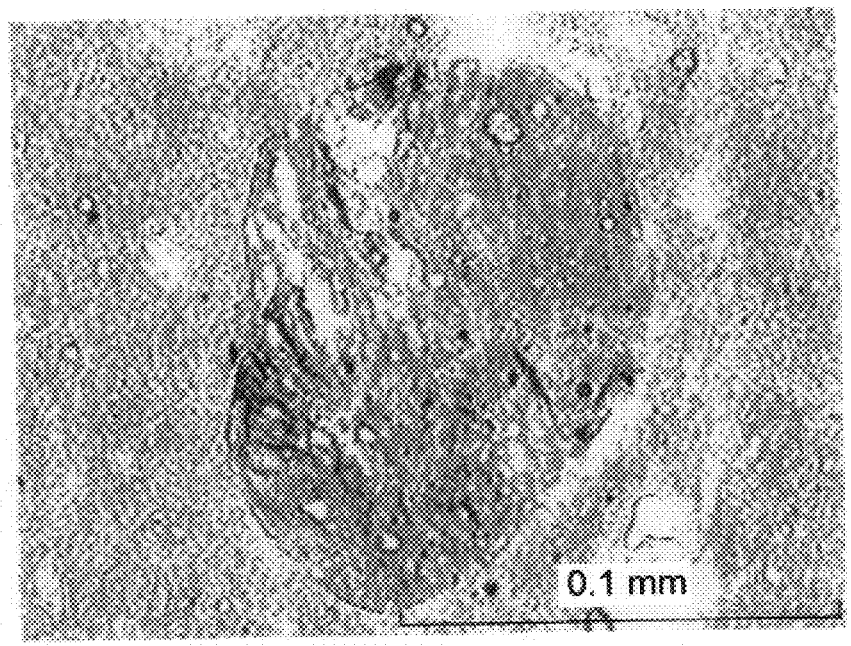
FIG. 2 is a magnified micrograph in the microscopical observation of FIG. 1.

FIG. 1 is a micrograph of a magnification of 100, and FIG. 2 is a micrograph of a magnification of 200. Lumps with a diameter of about 0.1 mm as seen on respective central portions of the micrographs are brown factices.

The performance of the resultant tires was evaluated by the below-mentioned evaluation method. Results thereof are shown in Tables 1 and 2.

<Evaluation Method>

1. Excessive Adhesion in Tire Production Process Steps (Evaluation of Excessive Adhesion)

The kart tires were produced by way of a kneading (rubber-kneading) step, in which the Banbury type mixer (50 liters, K50 made by Kobe Seikosho Co., Ltd., revolution number 50 rpm) and a sheeter roll (24 inches, revolution number 20 rpm, temperature conditioning 95° C.) were used, and an extruding step, in which an extruder (4.5 inches, cold feed type, revolution number 25 rpm, line speed 5 m/minute) was used. Hereinafter, the kneading and extruding steps were explained in detail.

Kneading (Rubber-kneading) Step

The above-mentioned components, as divided into the three batches, were mixed together by kneading (3-stage kneading) them with the Banbury type mixer, and to what degree the rubber composition adhered to a rotor in discharging the rubber composition from the Banbury type mixer and to what degree a sheet product adhered to the sheeter roll in forming the discharged rubber composition into the sheet product with the roll were observed. A stock rubber as obtained by cooling the sheet product was processed in the following extruding step.

Extruding Step

An extruded tread, as obtained by directly charging (cold-feeding) the stock rubber into the extruder and then discharging the stock rubber from the extruder, was subjected to a cooling step and then wound on to a reel. The extruded tread, standing in a heated state before cooling, was conveyed with a plenty of roller conveyors on a way to the cooling step after discharged from the extruder. In the extruding step, to what degree the extruded tread standing in a heated state adhered to the roll was observed.

The adhesion was evaluated on the basis of the following evaluation standard both in the above-mentioned rubber-kneading and extruding steps.

[In the Rubber-kneading Step]

⊚: There is no adhesion to the rotor in the Banbury or to the sheeter roll, and standard working can be done.

◯: There is a little adhesion in the Banbury, but this adhesion is dissolved with time.

Δ: There is adhesion, but working is possible by changing the revolution numbers of the rotor and the sheeter roll.

X: There is strong adhesion to the rotor in the Banbury, and working for removing this adhesion, for example, with a hand-scratching stick is needed. In addition, there is strong adhesion to the sheeter roll, and working nearly becomes possible by use of a lubricant (mold release agent).

XX: There is great adhesion to the rotor in the Banbury and to the sheeter roll, so no tire cannot be produced.

[In the Extruding Step]

⊚: The adhesion to the roller is low, and standard working can be done.

◯: There is a little adhesion to the roller, but working is not disturbed.

Δ: There is considerably strong adhesion, and an impression of the roller is left on the extruded tread.

X: There is considerably strong adhesion, and an impression of the roller is left on the extruded tread, and the measurements of the extruded tread are greatly changed because the extruded tread is extended due to the roller in the course to the cooling step.

XX: The adhesion to the roller is too strong to do working.

In addition, in Comparative Example 3, the tire production process steps were bad, so no tire could not be produced.

2. Lap Time of the Circuit Running (Evaluation of Wet Grippability)

A racing car as equipped with the above-obtained kart tires (size: Front 10*4.50–5 KT6, Rear 11*6.50–5 KT6) was allowed to run 10 laps on a wet circuit with a lap length of about 700 m, and the average value of three fastest lap time data was calculated.

In addition, in Comparative Example 5, the tire became abraded greatly, so the abrasion resistance was bad.

TABLE 1

| (Parts by weight) | Example | | | | |
|---|---|---|---|---|---|
| | 1 | 2 | 3 | 4 | 5 |
| SBR*1 | 137.5 | 137.5 | 137.5 | 137.5 | 137.5 |
| Carbon black*2 | 120 | 80 | 30 | 40 | 160 |
| Silica*3 | 80 | 120 | 100 | 180 | 40 |
| Factice*4 | 20 | 20 | 20 | 50 | 20 |
| Aromatic oil*5 | 150 | 150 | 75 | 170 | 150 |
| Stearic acid*6 | 2 | 2 | 2 | 2 | 2 |
| Zinc white*7 | 3 | 3 | 3 | 3 | 3 |

TABLE 1-continued

| (Parts by weight) | Example | | | | |
|---|---|---|---|---|---|
| | 1 | 2 | 3 | 4 | 5 |
| Coupling agent*8 | 8 | 12 | 10 | 18 | 4 |
| Sulfur*9 | 1.5 | 1.5 | 1.5 | 1.5 | 1.5 |
| Vulcanization accelerator CBS*10 | 2 | 2 | 2 | 2 | 2 |
| Vulcanization accelerator DPG*11 | 2 | 2 | 2 | 2 | 2 |
| Tire production process steps | | | | | |
| Rubber-kneading | Δ | ◯ | ◯ | Δ | Δ |
| Extruding | Δ | Δ | ◯ | Δ | Δ |
| Lap time of circuit running | 46"029 | 45"560 | 46"339 | 44"996 | 46"326 |

TABLE 2

| (Parts by weight) | Comparative Example | | | | |
|---|---|---|---|---|---|
| | 1 | 2 | 3 | 4 | 5 |
| SBR *1 | 137.5 | 137.5 | 137.5 | 137.5 | 137.5 |
| Carbon black *2 | 40 | 140 | 130 | 40 | 40 |
| Silica *3 | 40 | 10 | 130 | 180 | 180 |
| Factice *4 | 20 | 20 | 50 | 3 | 70 |
| Aromatic oil *5 | 15 | 100 | 210 | 170 | 170 |
| Stearic acid *6 | 2 | 2 | 2 | 2 | 2 |
| Zinc white *7 | 3 | 3 | 3 | 3 | 3 |
| Coupling agent *8 | 4 | 1 | 13 | 18 | 18 |
| Sulfur *9 | 1.5 | 1.5 | 1.5 | 1.5 | 1.5 |
| Vulcanization accelerator CBS *10 | 2 | 2 | 2 | 2 | 2 |
| Vulcanization accelerator DPG *11 | 2 | 2 | 2 | 2 | 2 |
| Tire production process steps | | | | | |
| Rubber-kneading | ⊚ | Δ | XX | X | ◯ |
| Extruding | ⊚ | Δ | — | X | ◯ |
| Lap time of circuit running | 48"029 | 47"123 | — | 46"006 | 44"322 |

*1 Styrene-butadiene rubber (TUFDENE 3330 made by ASAHI CHEMICAL INDUSTRY CO., LTD.), 137.5 parts by weight of which comprises 100 parts by weight of stryrne-butadiene rubber and 37.5 parts by weight of extended oil.
*2 N220 (made by MITSUBISHI CHEMICAL CORPORATION).
*3 ULTRASILVN3 (made by DEGUSSA).
*4 Brown factice (made by TENMA SABU KAKO CO., LTD.).
*5 Process X-260 (made by JAPAN ENERGY CO., LTD.).
*6 KIRI (made by NIPPON YUSHI CO., LTD.).
*7 Second grade zinc white (zinc oxide) (made by MITSUI MINING & SMELTING CO., LTD.).
*8 X50-S (made by DEGUSSA).
*9 Powdered sulfur with a zinc white (zinc oxide) content of 5% (made by KARUIZAWA SEIRENSHO CO., LTD.).
*10 N-cyclohexyl-2-benzothiazylsulfenamide, SANCELER CM-G (made by SANSHIN CHEMICAL INDUSTRY CO., LTD.).
*11 Diphenylguanidine (DPG), SOXINOL D (made by SUMITOMO CHEMICAL CO., LTD.).

<Results of Evaluation>

In Examples 1 to 5, no excessive adhesion occurred in the rubber-kneading or extruding step in the tire production process, and even if any adhesion occurred, the degree thereof was small. In addition, the lap time of the circuit running on a wet road was also satisfactory. As to Example 4, however, the abrasion resistance was a little inferior. On the other hand, in Comparative Examples 1, 2, and 5, no excessive adhesion occurred in the rubber-kneading or extruding step in the tire production process, and even if any adhesion occurred, the degree thereof was small, while the lap time of the circuit running on a wet road was not satisfactory, or even if the lap time was good, the tire became abraded greatly. Particularly, as to Comparative Example 5, the abrasion performance was extremely bad. In addition, in Comparative Examples 3 and 4, excessive adhesion occurred in the tire production process. Particularly, in Comparative Example 3, because the excessive adhesion was extreme, no tire could not be produced.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A racing tire tread rubber composition, comprising 100 parts by weight of a diene-based rubber wherein the diene based rubber is selected from the group consisting of styrene-butadiene rubber (SBR), butadiene rubber (BR), isoprene rubber (IR), isoprene-isobutyrene rubber (IIR), and butyl halide rubber (X-IIR); a filler, the entirety of which is in the range of 100 to 250 parts by weight containing 50% by weight or more of silica; and 5 to 50 parts by weight of a factice.

2. A racing tire tread rubber composition, consisting essentially of 100 parts by weight of a diene-based rubber wherein the diene based rubber is selected from the group consisting of styrene-butadiene rubber (SBR), butadiene rubber (BR), isoprene rubber (IR), isoprene-isobutyrene rubber (IIR), and butyl halide rubber (X-IIR); a filler, the entirety of which is in the range of 100 to 250 parts by weight containing 50% by weight or more of silica; and 5 to 50 parts by weight of factice.

3. A racing tire having a tread formed from the racing tire tread rubber composition according to claim 1.

4. A racing tire having a tread formed from the racing tire tread rubber composition according to claim 2.

* * * * *